Sept. 15, 1959     L. L. HAZEN     2,904,012

FLUID POWER ROTARY TRANSMITTER

Filed Jan. 31, 1957     2 Sheets-Sheet 1

INVENTOR.

LYSLE L. HAZEN

BY

ATTORNEYS

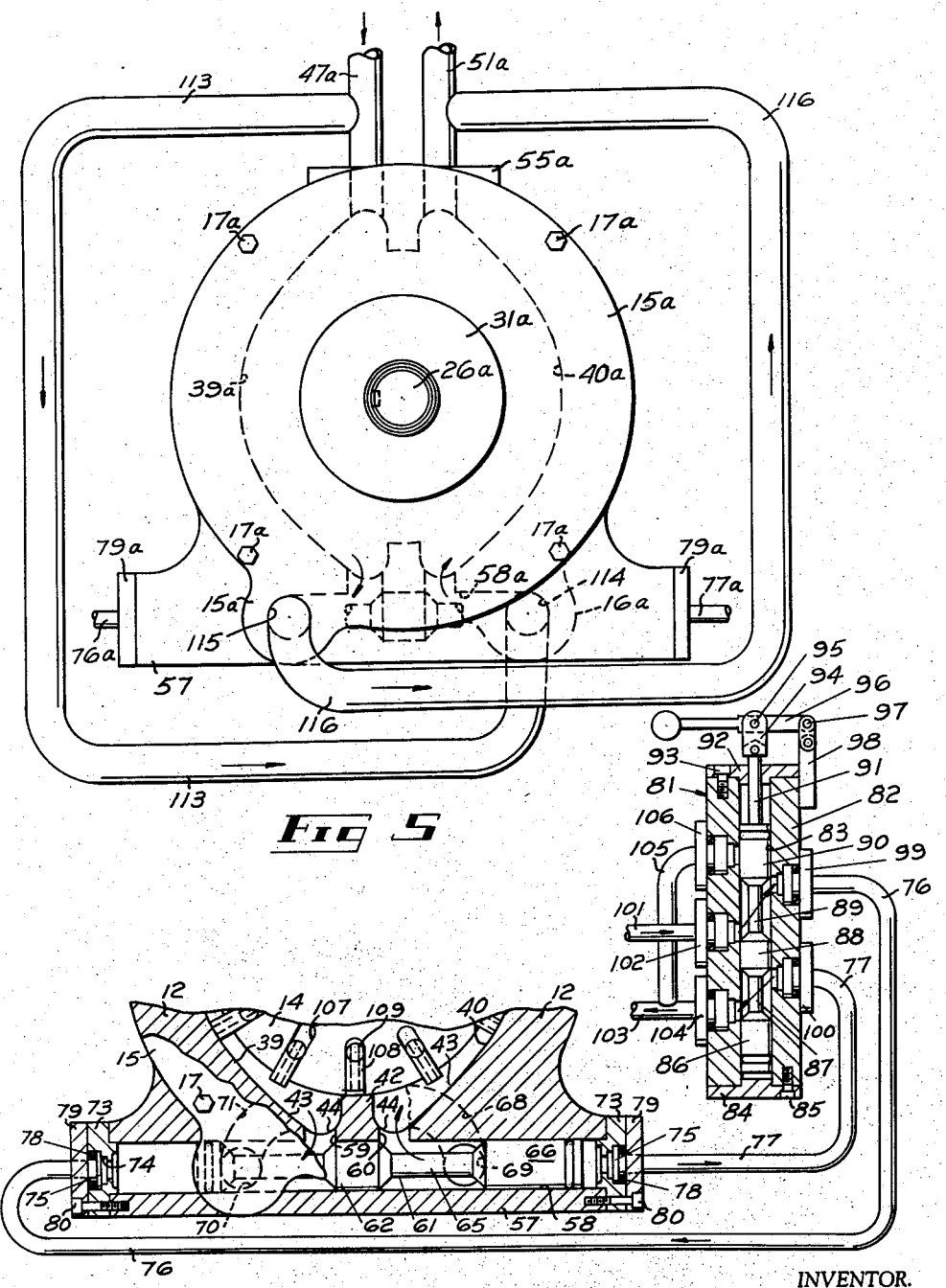

United States Patent Office 2,904,012
Patented Sept. 15, 1959

2,904,012

FLUID POWER ROTARY TRANSMITTER

Lysle L. Hazen, Detroit, Mich., assignor to Enterprise Machine Parts Corporation, Detroit, Mich., a corporation of Michigan Application January 31, 1957, Serial No. 637,400

8 Claims. (Cl. 121—90)

This invention relates to a novel and highly efficient fluid operated rotary power transmitter or motor which is capable of converting the energy in a fluid under pressure, as a hydraulic fluid, steam, a compressed gas, or air, into constant mechanical rotation or torque, for useful power drive purposes, as for driving the drive wheels of an automobile, the drive shaft of a machine tool, and other like purposes.

It is an object of this invention to provide a fluid operated rotary power transmitter which will provide a constant torque output and which is adapted for reversible rotation, and which is equally efficient when operating in either direction.

It is another object of this invention to provide a fluid operated rotary power transmitter which embodies multiple stages provided with balanced semi-circular passages, within which novelly constructed pistons are carried by a rotor or carrier into a near contact position with the outer surfaces of said semi-circular passages, and which passages are ported to permit a free balanced or equal quantity of flow of a pressurized fluid from a supply port to an exhaust port with no back pressure effect, whereby said pistons are carried or moved through said passages by said balanced flow of pressurized fluid, with a resulting constant torque being imparted to the piston carrier which in turn is adapted to transmit this constant torque to an operatively connected power drive shaft.

It is a further object of this invention to provide a fluid operated rotary power transmitter embodying multiple stage units and a fluid flow control means, whereby said stage units may be adapted for compound action or single action, as desired.

It is a still further object of this invention to provide a novel and improved fluid operated rotary power transmitter embodying pistons which are slidably mounted in radially disposed slots in a carrier and which have longitudinally extending holes therethrough which function to relieve any unbalanced forces thereon when the pistons are moved inwardly and outwardly in their respective slots.

It is another object of this invention to provide an improved fluid operated rotary power transmitter embodying a plurality of pistons slidably mounted on a rotor and which are provided with cams for moving the pistons relative to the rotor as the rotor is rotated, and wherein the cams are adapted to slide in a cam groove with slidable leather or equivalent sealing members being disposed in the cam groove between the cams to prevent bypassing of the fluid through the cam groove.

It is still another object of this invention to provide a fluid operated power transmitter of this class which is simple in structure, economical of manufacture, durable and compact and highly efficient in operation.

Other objects will appear hereinafter.

It is recognized that various modifications and changes may be made in the details of the structure illustrated without departing from the invention, and it is intended that the present disclosure shall be considered to be but the preferred embodiments.

Forming a part of this application are drawings, in which:

Fig. 5 is an end elevational view of another embodiment of the invention; and

Fig. 6 is a partial elevational sectional view of the flow control valve means illustrated in the embodiment of Fig. 1 but showing the valve means moved to a position to permit the transmitter to function in a single action, two stage manner.

Figure 1:
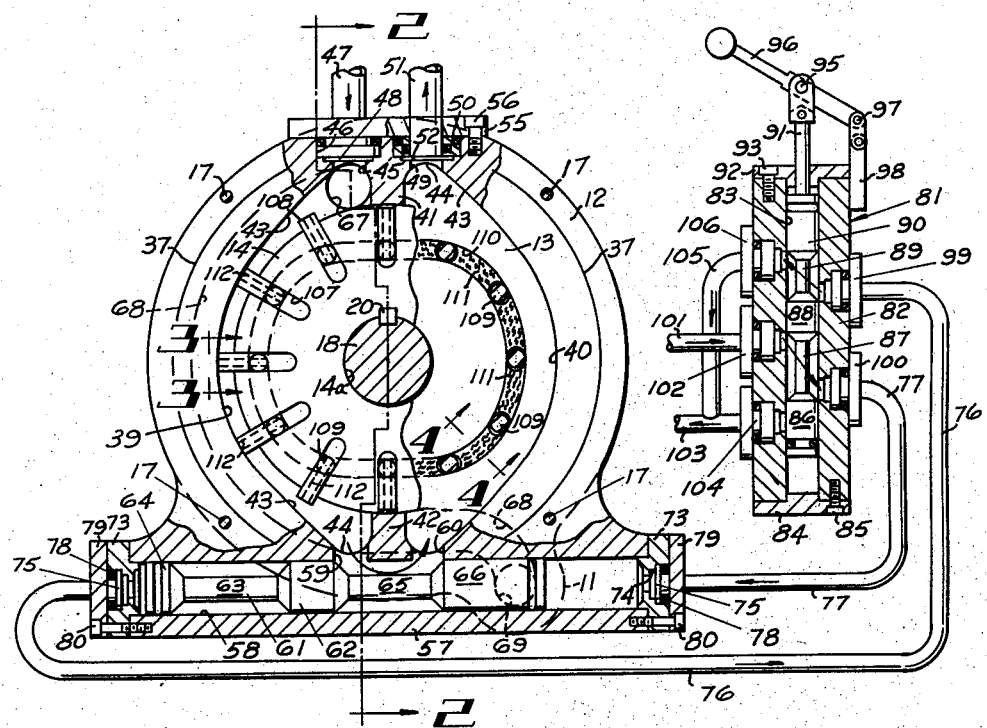
Fig. 1 is an end elevational view, partly in section and with parts removed and parts broken, of an illustrative embodiment of the invention.
Figures 2, 3, 4:
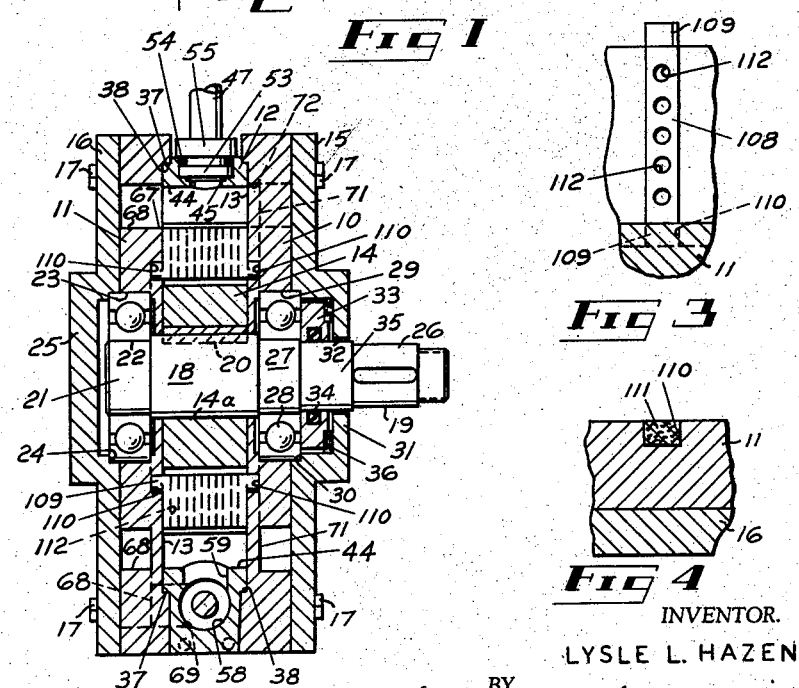
Fig. 2 is an elevational sectional view of the structure illustrated in Fig. 1, taken along the line 2—2 thereof and looking in the direction of the arrows.
Fig. 3 is an enlarged fragmentary view, partly in section, of the structure illustrated in Fig. 1, taken along the line 3—3 thereof and looking in the direction of the arrows.
Fig. 4 is an enlarged fragmentary sectional view of the structure illustrated in Fig. 1, taken along the line 4—4 thereof and looking in the direction of the arrows.

Referring now to the drawings, and in particular to Figs. 1 and 2, wherein an illustrative embodiment is shown which includes a cylindrical casing having a front casing part 10, a rear casing part 11 and an intermediate annular casing part 12 which are adapted to form therebetween a chamber 13 in which is rotatably mounted the rotor or carrier 14. The front and rear casing parts 10 and 11 are enclosed by the front and rear face plates 15 and 16, respectively, and, all the casing parts are held together by any suitable means, as by the bolts 17.

The rotor 14 is provided with an axial bore 14a for the reception therein of the enlarged hub 18 of the power output shaft generally designated by the numeral 19. The rotor 14 is fixedly mounted on the hub 18 by means of the lock key 20. The rear or stub end 21 of the shaft 19 is reduced and is operatively mounted in the ball bearing member 22 which is adapted to be mounted in the recess 23 in the outer face of the rear casing part 11. The rear cover plate 16 is provided with the recess 24 on the inner face thereof and the outer face of the bearing member 22 is seated in this recess. The rear cover plate 16 is provided with the outwardly extended boss 25 to provide clearance for the rear end of the shaft 19.

The output end 26 of the shaft 19 is provided with the reduced hub 27 adjacent the hub 18 which is operatively mounted in ball bearing member 28 which is adapted to be mounted in the recess 29 in the outer face of the front casing part 10. The front cover plate 15 is provided with the recess 30 on the inner face thereof and the outer face of the bearing member 28 is seated in this recess. The front cover plate 15 is provided with the outwardly extended hollow boss 31 which is provided with the bore 32 therethrough through which the output end 26 of the shaft 19 extends. The hollow boss 31 contains the spacer member 33 which abuts the bearing member 28 and which carries the oil seal ring 34 which is adapted to operatively engage the hub 35 on the output end of the shaft 19. A second sealing ring 36 is mounted between the spacer ring or member 33 and the inner face of the boss 31 to prevent leakage of oil from the casing.

As seen in Figs. 1 and 2, the intermediate annular casing part 12 is provided on each side thereof with an annular shoulder 37 which is adapted to be seated in a mating annular recess 38 in the front and rear casing parts 10 and 11. The annular member or casing part 12 is adapted to form a pair of balanced semi-circular passages as 39 and 40, between the rotor 14 and the inside surface of the member 12, which are separated by the dividing members 41 and 42. The passages 39 and 40 are oppositely disposed and are symmetrical in length and cross-section to provide for a balanced or equal quantity of flow of fluid therethrough. The inner surface of the annular casing part 12 tapers outwardly adjacent each side of the dividing members, as at 43, to form an enlarged area or chamber as 44. The chamber 44 at the entrance end of the semi-circular passage 39 communicates through the inlet or supply port 45 with the stepped aperture 46 in the upper end of the annular intermediate casing part 12. Mounted in the aperture 46 is a fluid supply line or conduit 47 which is provided with a flange 48 adapted to seat against the inner step of the aperture 46. The fluid supply line 47 would be connected to a suitable source of pressurized fluid. The chamber 44 at the exit end of the semi-circular passage 40 communicates through the outlet or discharge port 49 with the stepped aperture 50 in the upper end of the annular intermediate casing port 12. Mounted in the aperture 50 is a fluid exhaust line or conduit 51 which is provided with a flange 52 adapted to seat against the inner step of the aperture 50. The conduits 47 and 51 are held in place by means of the retainer rings 53 which are each provided with a pair of oil sealing rings as 54. The retainer rings 53 are secured in place by means of the retainer plate 55 which is fixedly secured in place by means of bolts as 56. The fluid exhaust line 51 would carry the fluid back to the source of pressurized fluid.

The lower end of the annular casing part 12 is enlarged and elongated as indicated by the numeral 57 and is provided with a longitudinal bore therethrough as indicated by the numeral 58. The semi-circular passageway 39 is provided with an outlet or exhaust port 59 which communicates with the longitudinal bore 58. The semi-circular passageway 40 is provided with an inlet or entrance port 60 which communicates with the longitudinal bore 50. Slidably mounted in the longitudinal bore 58 is the stage control spool valve 61. The spool valve 61 comprises a central spool portion 62, to one side of which is integrally connected the reduced neck portion 63. The reduced neck portion 63 is integral with a first end spool 64. Integral with the other side of this central spool 62 is a second reduced neck portion 65 to which is also integrally connected the second end spool 66.

As shown in Figs. 1 and 2, the rear casing part is provided with a port 67 which communicates with the entrance end of the semi-circular passageway 39 and which also communicates with the semi-circular passageway 68 which is formed in the outer faces of the rear casing part 11. The semi-circular passageway 68 is enclosed by a rear cover plate 16, and this passage is connected by means of the port 69 with the longitudinal bore 58 into the lower end of the central annular casing part 12.

As shown in Figs. 2 and 6, the front casing part 10 is provided with port 70 on the lower side thereof which communicates with the longitudinal bore 58 in the central annular casing part 12. The port 70 also communicates with the semi-circular passageway 71 which is formed in the outer face of the front casing part 10 and which communicates with the chamber 44 on the exit end of the semi-circular passageway 40 by means of the port 72.

The stage control spool valve 61 functions to permit the fluid to pass through the semi-circular passages 39 and 40 in either a single stage or compound stage action. For example, when the valve 61 is in the position shown in Fig. 1, the fluid will pass from the entrance conduit 47 through the semi-circular passageway 39, thence through the port 59 into the bore 58 and around the reduced neck portion 65 of the valve 61. The fluid then passes through the port 60 into semi-circular passage 40 and out through the discharge conduit 51. When the valve 51 is in the position shown in Fig. 6, the fluid would pass from the entrance conduit 47 into the semi-circular passage 39 and out through the port 59 into the longitudinal bore 58. The fluid from the semi-circular passage 39 would be exhausted through the port 70 and the semi-circular passageway 71, and the port 72 and out through the exhaust line 47. At the same time the fluid would be fed to the semi-circular passageway 40 as follows: fluid coming in through the entrance conduit 47 would pass through the port 67 and the semi-circular passageway 69 and through the port 69 into the bore 58 and thence around the reduced valve neck portion 65 and out through the port 60 into the semi-circular passageway 40. The fluid from the semi-circular passageway 40 would exit through the conduit 51 in the usual manner.

The bore 58 is enclosed at each end by end caps generally designated by the numerals 73 which are provided with stepped apertures therethrough as indicated by the numeral 74. The flange end 75 of the conduit is adapted to be seated in the inner end of each of the stepped apertures 74 and these conduits are indicated by the numerals 76 and 77. An oil sealing ring, as 78, is operatively mounted along the outer faces of the flanges 75. The end caps 73 are secured in place by the retainer plates 79 which are fixedly mounted to the casing part 57 by a suitable means, as by means of the bolts 80.

As shown in Figs. 1 and 6, the flow control valve or directional control valve 81 is provided to control the flow of fluid through the conduits 76 and 77 for moving the stage control valve 61 into its various operative positions. The valve 81 comprises the elongated body 82 in which is formed a longitudinal bore 83. The lower end of the bore 83 is enclosed by the end cap 84 which is secured in place by any suitable means, as by the bolts 85. The control valve 81 includes a spool valve comprising the spool 86 which is connected by the reduced neck portion 87 to the central spool 88. A reduced neck portion 89 connects the spool portion 88 with the upper spool portion 90. The rod 91 is integrally connected with the spool portion 90 and is slidably mounted through the upper end cap 92 which is fixed on the body 82 by means of the bolts 93. Fixedly mounted on the outer end of the rod 91 is a clevis 94 on which is pivotally mounted, as at the point indicated by the numeral 95, the hand control lever 96. The one end of the lever 96 is pivotally mounted, as at 97, to the upper end of the arm 98 which is fixedly mounted on the valve body 82 by any suitable means.

As shown in Figs. 1 and 6, the conduits 76 and 77 are connected by means of the fittings 99 and 100 to the longitudinal bore 83 of the valve 81. A conduit 101, which would be connected to a suitable source of pressurized fluid, is connected by means of the fitting 102 with the longitudinal bore 83 of the valve 81. A discharge conduit 103 which would be connected back to the source of pressurized fluid is connected by means of the fitting 104 to the bore 83 of the valve 81. A branch line 105 is connected to the exhaust line 103 and also through the fitting 106 to the bore 83 of the valve 81.

As best seen in Figs. 1, 2 and 6, the rotor 14 is provided with a plurality of radially disposed slots 107 which extend completely through the rotor and which are disposed around the periphery thereof. Slidably mounted in each of the slots 107 is a piston or blade 108 which is provided with a cam or projection 109 on each side thereof toward the inner end thereof. The cams or projections 109 are adapted to be slidably mounted in the cam grooves or tracks 110 which are formed in the inner face of each of the casing parts 10 and 11.

As shown in Figs. 1 and 6, an oil seal packing of leather or any other equivalent material is mounted in the cam groove 110 between the cams 109 to prevent by-passing of fluid through the cam groove 110. The pistons or blades 108 are provided with a plurality of longitudinally extending apertures 112 which extend completely through the pistons and which are adapted to prevent any unbalanced forces on the pistons when they are moved inwardly and outwardly of the slots 107 as the rotor 14 is turned.

In the practice of the invention, the output shaft 19 would be operatively connected to a power consuming device, as for example, the drive-wheel of an automobile, and the supply and exhaust lines 47 and 51 would be connected to a suitable pressurized fluid supply and reservoir means respectively. The supply and exhaust lines 101 and 103 for the fluid valve control means would also be connected to a suitable source of pressurized fluid and reservoir means respectively. With the control handle 96 of the valve 81 in the position shown in Fig. 1, fluid would pass from the line 101 around the reduced valve portion 81 and also through conduit 77 into the bore 58 whereby the stage control valve 61 would be moved to the position shown in Fig. 1. The pressurized fluid would then enter through the conduit 47 and would pass through the semi-circular passageway 39, through the port 59, into the bore 58, and thence through the port 60 and the circular passageway 40 and out through the exhaust line 51. As the fluid passes through the semi-circular passageways 39 and 40, the energy in the pressurized fluid is expended on the pistons or blade 108 which are moved in a counter-clockwise direction, as viewed in Fig. 1, and the rotor 14 and the output shaft 19 are actuated accordingly. The rotor may be reversed by simply reversing the fluid input through the conduit 51 instead of the conduit 47. When it is desired to change the stage action of the transmitter to provide a double action effect the directional control valve lever 96 is moved to the position shown in Fig. 6. When the flow control valve 81 is thus positioned the fluid under pressure is conducted through the conduit 76 and into the bore 58 so as to move the stage control valve 61 to the position shown in Fig. 6. When the valve 62 is in this position the fluid coming in through the conduit 47 passes through the semi-circular passage 39 and then exits through the port 70 and the circular passage 71 and port 72 and back through the exhaust line 51. Simultaneously, fluid is passing from the conduit 47 and through the port 67 and the circular passageways 68 into the valve bore 58 and the fluid then passes through the port 60 and into the semi-circular passageway 40 and out through the exhaust line 51. It will be seen that the fluid acts singly but simultaneously through each of the semi-circular passageways 39 and 40 and a compound two-stage action is provided.

Experience has shown that a fluid transmitter constructed in the aforedescribed manner provides a device which is very efficient in operation.

Fig. 5 shows a second embodiment of the invention in which the similar parts of the device are marked with the same numerals as used in the embodiment of Fig. 1, but in addition the small letter *a* has been added. The only difference between the embodiment of Fig. 5 and the embodiment of Fig. 1 is that the by-passing circular passages 68 and 71 are eliminated and in lieu thereof a pair of externally mounted tubes or conduits are provided. As shown in Fig. 5, the conduit 113 is connected to the entrance or supply conduit 47a and the conduit 113 would be connected through a port as 114 in the rear cover plate 16a. The port 114 would communicate with the port 69 into the rear casing part 11 which also communicates with the bore 58. The external conduit 116 would be connected by means of the port 115 into the front cover plate 15a with the port 70 in the front casing part 10. The conduit 116 would be connected at its front end to the exhaust conduit 51a. The operation of the embodiment of Fig. 5 would be the same as for the embodiment of Fig. 1.

It will be understood, that the principles of the invention could be incorporated in a fluid transmitter having more than two fluid semi-circular passageways as 39 and 40, and that if more than two such passageways are used, addition stage control valves as 61 may also be used between the additional passageways.

What I claim is:

1. A fluid operated power transmitter of the class described, comprising: a first casing part; a second casing part; an annular casing part carried between said first and second casing parts and adapted to coact therewith to form a chamber therebetween; means for securing said casing parts fixedly together; a rotor rotatably mounted in said chamber; a power output shaft fixedly mounted on said rotor and projecting outwardly of said casing parts; said annular casing part coacting with said rotor to form at least one substantially semi-circular balanced passage therebetween; said rotor being provided with a plurality of spaced apart radially disposed slots around the periphery thereof; said slots extending completely through the rotor from one side to the other side thereof; a piston slidably mounted in each of said slots with the side faces thereof being in slidable contact with the first and second casing parts; an integral cam mounted on the inner end of each of the side faces; a fluid supply port at one end of said semi-circular passage; a fluid exhaust port at the other end of said semi-circular passage; a dividing member between said ports extending into said passage and into near contact with said rotor; a cam groove in the inner surface of each of said first and second casing parts adapted to slidably receive the cams on the side faces of the pistons and to withdraw the pistons so as to clear the dividing member when the rotor is rotated by fluid under pressure which is admitted to the passage by said inlet port, and to move the pistons into the passage within a near contact position with said annular casing part for operative engagement by the fluid; and, said cam groove being filled with an oil sealing means between each of said cams to prevent the leakage of fluid through said cam groove.

2. A fluid operated power transmitter of the class described, comprising: a first casing part; a second casing part; an annular casing part carried between said first and second casing parts and adapted to coact therewith to form a chamber therebetween; means for securing said casing parts fixedly together; a rotor rotatably mounted in said chamber; a power output shaft fixedly mounted on said rotor and projecting outwardly of said casing parts; said annular casing part coacting with said rotor to form at least one substantially semi-circular balanced passage therebetween; said rotor being provided with a plurality of spaced apart radially disposed slots around the periphery thereof; said slots extending completely through the rotor from one side to the other side thereof; a piston slidably mounted in each of said slots with the side faces thereof being in slidable contact with the first and second casing parts; an integral cam mounted on the inner end of each of the side faces; a fluid supply port at one end of said semi-circular passage; a fluid exhaust port at the other end of said semi-circular passage; a dividing member between said ports extending into said passage and into near contact with said rotor; a cam groove in the inner surface of each of said first and second casing parts adapted to slidably receive the cams on the side faces of the pistons and to withdraw the pistons so as to clear the dividing member when the rotor is rotated by fluid under pressure which is admitted to the passage by said inlet port, and to move the pistons into the passage within a near contact position with said annular casing part for operative engagement by the fluid; said cam groove being filled with an oil sealing means between each of said cams, to prevent the leakage of fluid through said cam groove; and, said pistons being provided with a plurality of longitudinally extended bores therethrough to relieve any unbalanced forces when the pistons move inwardly and outwardly in said slots.

3. In a fluid operated power transmitter of the class described; a casing; a rotor operatively mounted in said casing; a power output shaft mounted on said rotor; a plurality of balanced semi-circular passages disposed around the periphery of said rotor in said casing; a plurality of pistons slidably mounted in said rotor for radial movement into and out of said passages; an integral cam means mounted on the inner end of each of said pistons; cam grooves in said casing adapted to coact with said cam means for moving said pistons into and out of said passages as the rotor is rotated; means for admitting fluid under pressure to said passages to provide a free flow of liquid therethrough for engaging said pistons to rotate said rotor; means for discharging the fluid from the passages; said pistons being provided with a plurality of bores extending longitudinally therethrough to relieve any unbalanced forces on said pistons when they move in said rotor; and, said cam grooves being filled with an oil sealing means between each of said cam means to prevent the leakage of fluid through said cam grooves.

4. In a fluid operated power transmitter of the class described: a casing; a rotor operatively mounted in said casing; a power output shaft mounted on said rotor; a plurality of balanced semi-circular passages disposed around the periphery of said rotor in said casing; a dividing member between said passages; a plurality of pistons slidably mounted in said rotor for radial movement into and out of said passages and to clear the dividing members between said passages; an integral cam means mounted on the inner end of each of said pistons; cam grooves in said casing adapted to coact with said cam means for moving said pistons into and out of said passages as the rotor is rotated; means for admitting fluid under pressure to said passages to provide a free balanced flow of fluid therethrough for engaging said pistons to rotate said rotor; means for discharging the fluid from the passages; said pistons being provided with a plurality of bores extending longitudinally therethrough to relieve any unbalanced forces on said pistons when they move in said rotor; and, said cam grooves being filled with an oil sealing means between each of said cam means to prevent the leakage of fluid through said cam grooves.

5. The invention as set forth in claim 4, wherein: said means for admitting fluid and means for discharging fluid from the semi-circular passages includes passages formed in said casing.

6. The invention as set forth in claim 4, wherein: said means for admitting fluid and means for discharging fluid from the semi-circular passages includes external conduits operatively connecting with said casing and passages.

7. In a fluid operated power transmitter of the class described: a casing; a rotor operatively mounted in said casing; a power output shaft mounted on said rotor; a plurality of balanced semi-circular passages disposed around the periphery of said rotor in said casing; a dividing member between said passages; a plurality of pistons slidably mounted in said rotor for radial movement into and out of said passages and to clear the dividing members between said passages; an integral cam means mounted on the inner end of each of said pistons; cam grooves in said casing adapted to coact with said cam means for moving said pistons into and out of said passages as the rotor is rotated; means for admitting fluid under pressure to said passages to provide a free balanced flow of fluid therethrough for engaging said pistons to rotate said rotor; means for discharging the fluid from the passages; said pistons being provided with a plurality of bores extending longitudinally therethrough to relieve any unbalanced forces on said pistons when they move in said rotor; said cam grooves being filled with an oil sealing means between each of said cam means to prevent the leakage of fluid through said cam grooves; a bore in said casing communicating with a pair of said passages; conduit means communicating said bore with the means for admitting fluid under pressure and to the means for discharging the fluid; and, a fluid operated flow control valve slidably mounted in said bore and movable to a first position to connect said pair of passages in series and to a second position to connect said pair of passages in parallel.

8. In a fluid operated power transmitter of the class described: a casing; a rotor operatively mounted in said casing; a power output shaft mounted on said rotor; a plurality of balanced semi-circular passages disposed around the periphery of said rotor in said casing; a dividing member between said passages; a plurality of pistons slidably mounted in said rotor for radial movement into and out of said passages and to clear the dividing members between said passages; an integral cam means mounted on the inner end of each of said pistons; cam grooves in said casing adapted to coact with said cam means for moving said pistons into and out of said passages as the rotor is rotated; means for admitting fluid under pressure to said passages to provide a free balanced flow of fluid therethrough for engaging said pistons to rotate said rotor; means for discharging the fluid from the passages; said pistons being provided with a plurality of bores extending longitudinally therethrough to relieve any unbalanced forces on said pistons when they move in said rotor; said cam grooves being filled with an oil sealing means between each of said cam means to prevent the leakage of fluid through said cam grooves; a bore in said casing communicating with a pair of said passages; conduit means communicating said bore with the means for admitting fluid under pressure and to the means for discharging the fluid; a fluid operated flow control valve slidably mounted in said bore and movable to a first position to connect said pair of passages in series and to a second position to connect said pair of passages in parallel; and a manually operated fluid directional valve means for selectively controlling the movement of the flow control valve.

References Cited in the file of this patent

UNITED STATES PATENTS

| 344,019 | Toliver et al. | June 22, 1886 |
| 625,800 | Pickel et al. | May 30, 1899 |
| 727,434 | Pettengill | May 5, 1903 |
| 794,723 | Lofton | July 18, 1905 |
| 1,043,945 | Lentz | Nov. 12, 1912 |
| 1,597,542 | Polsley | Aug. 24, 1926 |

FOREIGN PATENTS

| 29,317 | Great Britain | 1909 |
| 182,320 | Great Britain | July 6, 1922 |